United States Patent Office 2,963,465
Patented Dec. 6, 1960

2,963,465

PROCESS FOR THE MANUFACTURE OF LINEAR POLYUREA POLYMERS

Gerrit Johann Meine van der Kerk, Utrecht, Netherlands, assignor to Nederlandse Organisatie voor Toegepast-Natuurwetenschappelijk Onderzoek ten behoeve van Nijverheid, Handel en Verkeer, The Hague, Netherlands, a corporation of the Netherlands No Drawing. Filed Oct. 11, 1956, Ser. No. 615,238

9 Claims. (Cl. 260—77.5)

This invention relates to an improved process for the manufacture of linear polyurea polymers of high molecular weight, to such high molecular weight polymers having fiber-forming characteristics, and to fibers produced therefrom.

Processes have heretofore been developed for the production of linear polyurea polymers which have fiber-forming characteristics. Thus, co-pending U.S. patent applications Ser. No. 317,352, filed October 28, 1952, and now abandoned, and Ser. No. 420,197, filed March 31, 1954, and now U.S. Patent 2,820,024, issued January 14, 1958, describe processes for the production of highly polymerized polyurea. In the processes described in said applications, diamines having a carbon chain of at least four carbon atoms between the amino groups are first reacted with carbonyl sulfide to produce thiocarbamic acid salts having the general formula:

FORMULA I

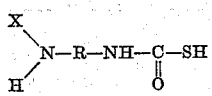

in which X may be a hydrogen atom or a lower alkyl group and R is a linear or cyclic organic group having a chain of at least four carbon atoms.

According to the process disclosed by U.S. Patent 2,820,024, a thiocarbamic acid salt (Formula I) is heated under vacuum at temperatures within the range of about 180° C. to about 225° C. for a period of about 15 hours to about 20 hours to produce a highly polymerized linear polyurea which has fiber-forming properties.

The process disclosed by U.S. patent application Ser. No. 317,352 is a two-step process for the production of polyureas of high molecular weight, the first step of which consists of heating a thiocarbamic acid salt having the general formula given hereinbefore (Formula I) to produce sulfur-free polymers containing about 10 to 15 monomeric units, corresponding to an average molecular weight of between 1000 and 2500. This step is carried out to a reaction temperature below about 150° C. and, preferably, at a temperature within the range of about 110° C. and 120° C. for a period of about two hours. It is carried out under vacuum to remove the hydrogen sulfide and less volatile products evolved by the reaction. In the second step of this process this intermediate polymer is further heated at a temperature of about 180° C. to about 220° C. for a period of about 15 to about 20 hours to produce a linear polyurea polymer of high molecular weight.

The processes disclosed by these U.S. patent applications produce linear polyurea polymers having molecular weights within the range of 5000 to 10,000. It is only by the use of the prolonged heating periods within the range of 15 to 22 hours that polymers having molecular weights which are sufficiently high to have fiber-forming properties are obtained by these processes.

The polymerization of the thiocarbamic acid salt has been thought to take place according to the reaction, which in its first stage can be represented by the following equation:

Equation I

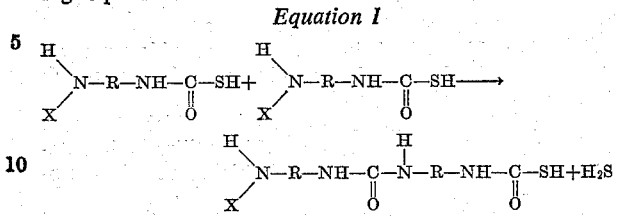

in which X and R have the same meaning as in Formula I. However, the fact that a sulfur-free product is obtained which is a polymer of about 10–15 monomeric units in an early stage of the heating and prolonged heating at a higher temperature is required to produce a high molecular weight polymer, gave basis for the belief that a competing reaction takes place according to the following equation:

Equation II

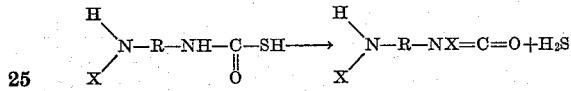

which acts to stop the polymerization at the lower reaction temperatures. The X and R in this equation have the same meaning as in Formula I. Thus, the sulfur-free product obtained at the end of the first step of the process of U.S. application Ser. No. 317,352 was believed to have the following general formula:

FORMULA II

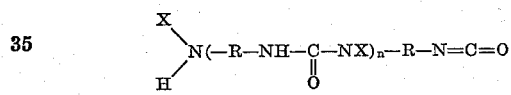

wherein R and X have the same meaning as in the general formula given hereinbefore and $n$ is a whole number between 10 and 15. This product was believed to further polymerize at a higher temperature by a direct addition reaction represented by the following equation:

Equation III

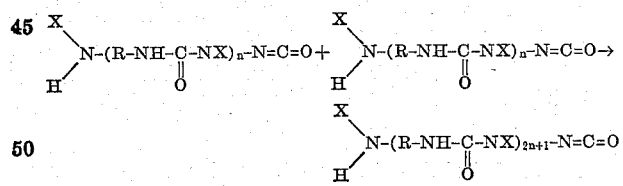

Regardless of the polymerization reaction involved, prolonged heating has heretofore been required to produce a linear polymeric polyurea by these processes, which has a molecular weight within the range of 5000–10,000 and has fiber-forming characteristics.

In principle it is quite possible to obtain higher molecular weight products according to this method but owing to the high temperatures required for the polymerization reaction and the long duration of this reaction a disadvantageous side-reaction becomes manifest, which causes in the long run a certain amount of cross-linking in the polymers leading to products with a reduced linearity, which becomes apparent from a lowering of the fiber-forming qualities.

An important object of the present invention is to provide a linear polyurea polymer which has an average molecular weight which can be well over 10,000 and which has excellent fiber-forming characteristics owing to its exclusive linearity, which adapt it for the production of textile fibers by hot-melt spinning followed by cold elongation, which are of high tensile strength and which are very resistant to the action of both mineral acids and alkali metal hydroxides.

Another object of this invention is to provide a process for the production of linear polyurea polymers of high molecular weight which does not require the extended heating periods and the high reaction temperatures utilized in the above described processes.

Another object of this invention is to provide a process for the production of linear polyurea polymers which have average molecular weights in excess of 10,000 and excellent fiber-forming characteristics, which is more efficient than the prior processes, which utilize both materially longer reaction periods and higher reaction temperatures.

Other objects of this invention and its various advantageous features will become apparent from the detailed description of this invention which follows.

This invention is the result of my discovery that during the heating of a thiocarbamic acid salt having the general Formula I, carbonyl sulfide, as well as hydrogen sulfide, is given off by the polymerization reaction. I have been able to identify carbonyl sulfide in the gas which is evolved upon heating such thiocarbamic salts under vacuum to temperatures of about 110° C.–120° C. This fact raised a question as to the accuracy of Formula II for the intermediate sulfur-free product. It now appears from this evolution of carbonyl sulfide, from the titration of the end groups of the sulfur-free polymer of intermediate molecular weight and the determination of the osmotic pressure of a solution of this polymer in a solvent, that it carries two amino end groups. This indicates that, instead of the general Formula II, the intermediate sulfur-free polymers have the following general formula:

FORMULA III

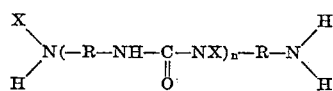

in which X, R, and n have the same meaning as in Formula II. This formula suggested to me that an atmosphere containing carbonyl sulfide should expedite the further polymerization of this intermediate polymer. Regardless of the accuracy of the formula, I have found that the presence of carbonyl sulfide has the effect of both expediting the polymerization reaction and of enabling me to carry the polymerization further than has heretofore been possible. The result has been both a material increase in process efficiency and the production of a highly polymerized polyurea which has a higher molecular weight than the polymers heretofore produced.

It is my belief that the over-all reaction by which the sulfur-free intermediate polymer (Formula III) is further polymerized in the presence of carbonyl sulfide in this process involves two successive reactions, the first of which is in accordance with the following equation:

*Equation IV*

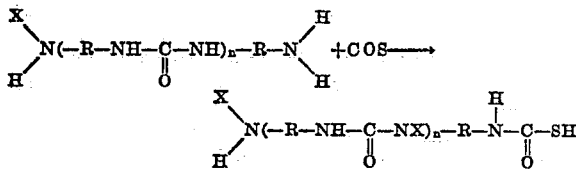

The X, R, and n in this equation have the same meaning as in Formula II. However, I remark that as n can be taken as the average degree of polymerization, practically, n need not be a whole number.

The thio-carbamic acid groupings in the addition product formed by this reaction are believed to react with a free-$NH_2$ end groups which have not reacted with COS, in accordance with the following reaction equation:

*Equation V*

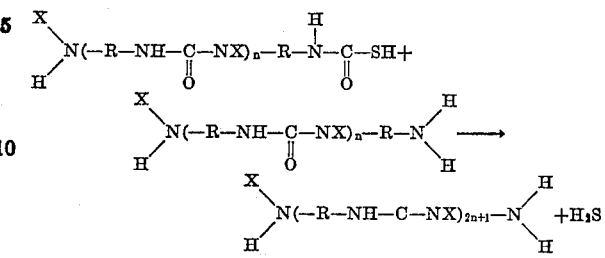

Thus, the carbonyl sulfide is believed to furnish a carbonyl coupling group which enables the polymerization reaction to continue, and to produce macro-molecules of progressively increasing size. It will be noted that the sulfur content of the polymer is transitory since it is evolved as hydrogen sulfide.

Since the temperatures used or necessary in the new process are so much lower, as compared with the old process, cross-linking does not occur to any observable degree.

The product in accordance with this invention is a highly polymerized linear polyurea characterized by a molecular weight which may be in excess of 10,000. This polymer is believed to be represented by general formula:

FORMULA IV

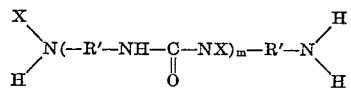

in which X is hydrogen or an alkyl group containing one to three carbon atoms, R' is a linear or cyclic group containing from four to sixteen carbon atoms and m is a number larger than 30 but preferably larger than 50 corresponding to molecular weight in excess of 10,000.

As can readily be seen from the foregoing explanation of the mechanism of the reaction, the final polymer may contain a small percentage of the sulfur containing

terminal groups replacing the

amino terminal groups. However, the actual percentage of sulfur carried by any such residual terminal groups is extremely small since the average molecular weight of the polymer is so high.

This product may be in the form of a solid obtained as a direct result of the extensive polymerization of a thiocarbamic acid salt having the general formula:

FORMULA V

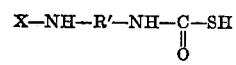

in which X and R' have the same meaning as in Formula IV. Alternatively, this product may be in the form of a textile fiber, formed by the hot melt spinning of the material resulting from the polymerization reaction, followed by a cold elongation of the fiber to orient its molecular arrangement. This textile fiber is characterized by high tensile strength and excellent resistance to the action of both mineral acids and aqueous solutions of alkali metal hydroxides.

By the process in accordance with this invention, a thiocarbamic salt, which has the general Formula V and which is produced by the reaction of a diamine with carbonyl sulfide and is isolated subsequently, is then polymerized by heating it to an elevated reaction temperature, below the melting point of the thiocarbamic acid salt. At least the latter part of the polymerization reaction is also carried out in the presence of added carbonyl sulfide. The melting of the reaction mixture must be avoided, since carbonyl sulfide penetrates into the molten mass only with difficulty. The desired highly polymerized product is not produced in a fused reaction mixture.

Diamines which are suitable for use in this process are those which have the general formula:

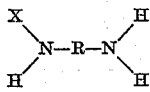

in which X is hydrogen or an alkyl group containing one to three carbon atoms and R is a linear or cyclic group containing four to sixteen carbon atoms. Suitable diamines are, for example:

ω,ω' hexa methylene diamine and its hepta, octa, nona, deca, undeca and dodeca methylene homologues; further N monomethyl ω,ω' hexamethylene diamine and its homologues up to and including N mono methyl ω,ω' decamethylene diamine.

In carrying out this process, carbonyl sulfide may be added to the atmosphere in which the reaction is carried out, throughout the entire reaction period. Alternatively, the reaction mixture may be heated under vacuum until the intermediate sulfur-free polymerization product (Formula III) is formed and then the polymerization reaction completed in the presence of an atmosphere containing carbonyl sulfide.

The polymerization reaction may be carried out in a closed vessel in the presence of an atmosphere containing added carbonyl sulfide, or it may be carried out in an open system through which a slow stream of gas containing carbonyl sulfide is passed. In either alternative, it is desirable to keep the reaction mixture, which is in the form of a powder, in constant motion as, for example, by slow stirring, shaking or other agitation to insure good contact between the unreacted or partially reacted powder and the carbonyl sulfide. This causes the reaction to proceed more quickly through the whole reaction mixture and shortens the time required to secure complete reaction to a highly polymerized product.

In carrying out this reaction either in a closed or open system it is desirable to keep the reactants in a gaseous atmosphere which contains at least 1% by volume and, to ascertain a reasonably high reaction velocity, more than 10%, and preferably, 30% or more by volume of carbonyl sulfide. The residual gas in a carbonyl sulfide-containing gas mixture should be one which is inert to the reaction mixture, such as, for example, nitrogen or argon. Carbonyl sulfide which is a gas at normal and elevated temperatures (B.P.—50.2° C. at 760 mm.) may be used, as such, as the reaction atmosphere, or it may be mixed with an inert diluent gas in the desired proportions to provide the reaction atmosphere. This atmosphere may be, and preferably is, maintained under a pressure which is substantially equal to normal atmospheric pressure, although it may be under either sub-atmospheric pressure or superatmospheric pressure.

In carrying out this process, I prefer to use a reaction temperature within the range of about 90° C. to about 150° C. or even the more narrow range of about 100° C. to about 120° C., throughout the entire reaction. However, higher temperatures approximating 180° C. or even above 200° C. but below the melting point of the reaction mixture, are not harmful during the latter part of the reaction period during which the sulfur-free intermediate polymers are converted to the highly polymerized final products. A reaction period of about 5 to about 7 hours at a temperature of about 110° C. to about 120° C. is ordinarily sufficient to complete the reaction of the original thiocarbamic acid salts to a sulfur-free, highly polymerized, linear polyurea.

In a preferred embodiment of this process, the reaction mixture is heated with slow stirring in an open system through which is passed a slow stream of carbonyl sulfide or of a mixture of carbonyl sulfide and nitrogen containing, for example, thirty-five percent by volume of carbonyl sulfide. I prefer to start the heating of the thiocarbamic acid salt under an atmosphere containing carbonyl sulfide provide by the slow gas stream and to continue this gas stream until the reaction is entirely completed.

Alternatively, the reaction mixture may be heated under vacuum at a temperature above 90° C., but below about 110° C. to about 120° C. until the reaction mixture is substantially completely free of sulfur and in the form of an intermediate polymeric compound. The heating is then continued to keep the reaction mixture within this temperature range or at a somewhat higher temperature while providing the reaction mixture with an atmosphere of an inert gas containing a substantial proportion of carbonyl sulfides.

The product in accordance with this invention, as produced by this process, is a highly polymerized linear polyurea, characterized by an average molecular weight in excess of 10,000. It differs from the polymerized polyureas which have heretofore been produced in this high average molecular weight and in the improved properties which result from its high degree polymerization. The polymerized polyureas of the patent applications heretofore referred to have had molecular weights within the range of 5,000 to 10,000 and are inferior to my new product in many respects.

The highly polymerized polyurea in accordance with this invention has excellent fiber-forming properties and it is in the form of fiber that its advantageous feature become most apparent. This product is fusible and, therefore, suitable for the formation of fibers by not melt spinning methods. The cold stretching of such fibers causes them to develop a remarkably high tensile strength. Furthermore, these fibers have the advantageous features of high resistance to both mineral acids and to aqueous solutions of alkali metal hydroxides.

The following examples give specific embodiments of the process and the products of this invention, but it will be understood that the invention is not limited to the examples chosen for the purposes of illustration.

EXAMPLE I (A) To form a basis for comparison of the effectiveness of the carbonyl sulfide atmosphere in the process of this invention, the thiocarbamic acid salt of ω,ω'-decamethylene diamine was produced by the reaction of carbonyl sulfide with ω,ω'-decamethylene diamine dissolved in toluene and, after its isolation, it was heated under vacuum at a temperature of about 100° C. for three hours, then at about 120° C. for two hours. The reaction product was a white powder in which substantially no sulfur could be detected. It had a molecular weight of about 2600 and had no fiber-forming capacity. A continued heating of portions of this sulfur-free polymer for five hours at 120° C. under vacuum and in an atmosphere of nitrogen, respectively, made no change in its properties.

(B) A portion of this same sulfur-free pre-polymer was reacted by the process of this invention by heating it for a period of five hours at a temperature of 120° C., under a slow stream of carbonyl sulfide. The reaction product was a highly polymerized polyurea having a molecular weight of about 12,500 and a melting point of about 235° C. Fibers were produced from this product by hot melt spinning and cold stretching. These fibers were found to have the following properties:

Tensile strength—4960 kg./sq. cm.
Elongation on break—25%.

Furthermore, these fibers were found by test to be resistant to boiling in a 10 percent solution of sodium hydroxide and in a 10 percent solution of sulfuric acid.

EXAMPLE II

The thiocarbamic salt of ω,ω' dodecamethylene diamine was produced by the reaction of carbonyl sulfide with ω,ω' dodecamethylene diamine dissolved in toluene. It was filtered off and dried in vacuum. The product obtained was converted into a substantially sulfur-free product as described in Example I(A). This product was heated as described in Example I(B), however, the carbonyl sulfide now consisting of a mixture of 50% carbonyl sulfide and 50% nitrogen. The reaction product was a highly polymerized polyurea having a molecular weight of about 11,500 and a melting point of 210° C. This reaction product had excellent fiber-forming properties and was generally very similar to the reaction product of Example I(B).

EXAMPLE III

The thiocarbamic acid salt of ω,ω' decamethylene diamine, described in Example I was heated at a temperature within the range of 100° C. and 110° C. whilst maintaining an absolute pressure of about 10 cm. Hg, and when after a period of circa 2 hours the evolution of $H_2S$ decreased the temperature was raised to 115 to 120° C. and a slow stream of carbonyl sulfide was led over, maintaining substantially the same pressure as in the first heating period. After a total heating period of 4 hours the pressure was released, but the slow stream of carbonyl sulfide and the heating were continued for yet four hours. The reaction product resulting from this treatment was a highly polymerized polyurea, having a molecular weight of about 14,000 and a melting point of 235° C., and having properties substantially identical to those of the product obtained in Example I(B).

In substantially the same way as described above other linear polyurea were produced, which are listed in the table below.

TABLE

| Polyalkylene urea | Melting pt., °C. | "Tensile strength" kg. cm.² | Stretchability | | Average molecular weight |
|---|---|---|---|---|---|
| | | | cold | warm | |
| hexa | 300 | 4,750 | — | + | 16,000 |
| hepta | 220 | 4,500 | + | + | 11,000 |
| octa | 265 | 5,050 | ± | + | 13,500 |
| nona | 218 | 4,900 | + | + | 12,000 |
| deca | 235 | 5,100 | + | + | 12,000–15,000 |
| dodeca | 210 | 4,600 | + | + | 11,500 |

As clearly demonstrated by the foregoing examples, the process in accordance with this invention produces a highly polymerized polyurea in a total heating period of about 8 to 12 hours, as compared with reaction periods of 20 to 25 hours required by the processes of said prior applications. Further, it will be noted that reaction temperatures of 115° C.–120° C. were used, as compared with reaction temperatures as high as 220° C. required by the prior processes for the second stage of the polymerization. Both the shorter reaction time and the lower temperatures required by this process are definitely advantageous in the commercial production of these products.

These advantageous process features and the improved properties of the product are definitely due to the presence of carbonyl sulfide in the atmosphere in which the reaction is carried out. This is clearly illustrated by the comparison presented by Example I which shows that with exactly the same reaction temperature a highly polymerized polyurea having a molecular weight of 12,500 having excellent fiber-forming properties was formed from the sulfur-free pre-polymer in five hours in an atmosphere of carbonyl sulfide, whereas in the absence of added carbonyl sulfide a reaction period of five hours failed to yield a high-molecular weight product having fiber-forming properties.

In the reactions with which this invention is concerned the polymerization reaction eliminates the sulfur from the original thiocarbamic salt. In view of this fact, the effectiveness of carbonyl sulfide in promoting the polymerization reaction is unexpected. In the foregoing description of this invention, formulas and equations have been given in explaining the invention. While it is believed that these formulas and equations are in accord with the facts, it will be understood that they have been given solely for the purposes of explanation and not by way of limitation of the scope of the invention.

Although, I have specifically exemplified the process in accordance with this invention and have given alternative procedures and specific details as to the reaction time, the reaction temperature, and other variables in the process, as well as various alternative materials for making the product, it will be understood that these are for illustrative purposes only and that various modifications and changes may be made in the process and a wide variety of diamines may be used as one of the raw materials, without departing from the spirit of my invention or the scope of the following claims.

I claim:

1. A process for the manufacture of a linear, highly polymeric polyurea which includes the steps of reacting a diamine with carbonyl sulfide to produce a thiocarbamic acid salt having the general formula:

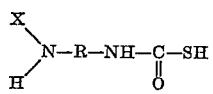

in which X is selected from the group consisting of hydrogen and an alkyl group containing from 1 to 3 carbon atoms and R is a hydrocarbon radical containing four to sixteen carbon atoms, isolating and drying said salt, and then polymerizing this carbamic salt at a temperature above 90° C. but below its melting point while contacting it with added gaseous COS containing up to 99% of an inert diluent gas, at least during the final stage of the polymerization reaction, wherein the total required polymerization time is between about 5 and about 12 hours.

2. A process for the manufacture of a linear, highly polymeric polyurea which may be conducted at atmospheric pressure which includes the steps of reacting a diamine with carbonyl sulfide to produce a thiocarbamic acid salt having the general formula:

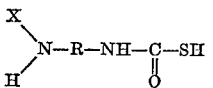

in which X is selected from the group consisting of hydrogen and an alkyl group containing from 1 to 3 carbon atoms and R is a hydrocarbon radical containing four to sixteen carbon atoms, isolating and drying said salt, and then polymerizing this thiocarbamic salt at a temperature within the range of about 90° C. to about 150° C. while contacting it with added gaseous COS containing up to 99% of an inert diluent gas throughout the polymerization reaction, wherein the total required polymerization is between about 5 and 12 hours.

3. The process of claim 2 in which the polymerization reaction is carried out at a temperature within the range of about 100° C. to about 120° C.

4. The process of claim 2 in which the polymerization reaction is carried out in the presence of a flowing stream of added gaseous carbonyl sulfide.

5. The process of claim 2 in which the polymerization reaction is carried out in the presence of a flowing stream of a mixture of nitrogen and at least ten percent by volume of carbonyl sulfide.

6. The process of claim 2 in which the polymerization reaction mixture is maintained at a temperature of within the range of about 90° C. to about 150° C. for a period within the range of about eight to about twelve hours.

7. A process for the manufacture of a linear highly polymeric polyurea which may be conducted at atmospheric pressure which includes the steps of reacting a diamine having the general formula:

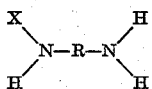

in which X is selected from the group consisting of hydrogen and an alkyl group containing from 1 to 3 carbon atoms, and R is a hydrocarbon radical containing four to sixteen carbon atoms with carbonyl sulfide to produce a thiocarbamic salt, isolating and drying said salt, and polymerizing this thiocarbamic salt by heating it under vacuum at a temperature within the range of about 90° C. to about 150° C. until the evolution of hydrogen sulfide and carbonyl sulfide from the reaction mixture ceases and then continuing the polymerization at an elevated temperature above 90° C. but below the melting point of the reaction mixture, while agitating the solid reactants in contact with a flowing stream of added gaseous COS containing up to 90% of an inert diluent gas, wherein the total required polymerization time is between about 5 and about 12 hours.

8. The process of claim 7 in which the first stage of the polymerization under vacuum is carried out at a temperature within the range of about 100° C. to about 120° C. and the second stage of the polymerization is carried out at a temperature within the range of about 100° C. to about 180° C. in the presence of a flowing stream of added gaseous carbonyl sulfide.

9. The process of claim 7 in which the first stage of the polymerization under vacuum is carried out at a temperature within the range of about 100° C. to about 120° C. and the second stage of the polymerization is carried out at a temperature within the range of about 100° C. to about 180° C. in the presence of a flowing stream of added gaseous COS containing up to 70% by volume of nitrogen as a diluent gas.

References Cited in the file of this patent

UNITED STATES PATENTS

| | | |
|---|---|---|
| 2,292,443 | Hanford | Aug. 11, 1942 |

FOREIGN PATENTS

| | | |
|---|---|---|
| 461,237 | Great Britain | Feb. 9, 1937 |
| 524,795 | Great Britain | Aug. 14, 1940 |
| 495,956 | Canada | Sept. 8, 1953 |
| 494,500 | Belgium | Mar. 31, 1950 |
| 515,114 | Belgium | Nov. 14, 1952 |
| 172,068 | Austria | Jan. 15, 1952 |

OTHER REFERENCES

Schmidt et al.: Principles of High-Polymer Theory and Practice, McGraw-Hill, 1948, pp. 236–239. (Copy in Sci. Lib.)

UNITED STATES PATENT OFFICE
CERTIFICATION OF CORRECTION

Patent No. 2,963,465                           December 6, 1960

Gerrit Johann Meine van der Kerk

It is hereby certified that error appears in the above numbered patent requiring correction and that the said Letters Patent should read as corrected below.

Column 4, line 40, for "to molecular" read -- to a molecular --; column 6, line 10, for "provide" read -- provided --; line 22, for "sulfides" read -- sulfide --; line 38, for "not melt" read -- hot melt --.

Signed and sealed this 29th day of August 1961.

(SEAL)
Attest:

ERNEST W. SWIDER
Attesting Officer

DAVID L. LADD
Commissioner of Patents